(12) United States Patent
Srinivasan

(10) Patent No.: US 8,918,581 B2
(45) Date of Patent: Dec. 23, 2014

(54) ENHANCING THE LIFETIME AND PERFORMANCE OF FLASH-BASED STORAGE

(75) Inventor: KY Srinivasan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 83 days.

(21) Appl. No.: 13/437,006

(22) Filed: Apr. 2, 2012

(65) Prior Publication Data

US 2013/0262746 A1 Oct. 3, 2013

(51) Int. Cl.
*G06F 12/02* (2006.01)
*G06F 12/08* (2006.01)

(52) U.S. Cl.
CPC ........ *G06F 12/0246* (2013.01); *G06F 12/0866* (2013.01)
USPC .......................................... 711/103

(58) Field of Classification Search
CPC .......................... G06F 12/0246; G06F 12/0866
See application file for complete search history.

(56) References Cited

U.S. PATENT DOCUMENTS

| | | | |
|---|---|---|---|
| 6,026,027 A | 2/2000 | Terrell, II et al. | |
| 7,752,391 B2* | 7/2010 | Cornwell et al. | 711/118 |
| 8,239,617 B1* | 8/2012 | Linnell | 711/103 |
| 8,296,504 B2* | 10/2012 | Chu et al. | 711/103 |
| 2009/0259800 A1 | 10/2009 | Kilzer et al. | |
| 2010/0017556 A1 | 1/2010 | Chin et al. | |
| 2010/0064095 A1* | 3/2010 | Chen et al. | 711/103 |
| 2010/0306448 A1 | 12/2010 | Chen et al. | |
| 2010/0306577 A1 | 12/2010 | Dreifus et al. | |
| 2011/0072196 A1 | 3/2011 | Forhan et al. | |
| 2011/0252181 A1 | 10/2011 | Ouye et al. | |
| 2012/0159051 A1* | 6/2012 | Hida et al. | 711/103 |
| 2012/0254507 A1* | 10/2012 | Chang et al. | 711/103 |

FOREIGN PATENT DOCUMENTS

| | | |
|---|---|---|
| EP | 0392895 A2 | 10/1990 |
| WO | 2009/031727 A1 | 3/2009 |

OTHER PUBLICATIONS

Sun, et al., "A Hybrid solid-state storage architecture for the performance, energy consumption, and lifetime improvement", Retrieved at <<http://ieeexplore.ieee.org/stamp/stamp.jsp?tp=&arnumber=5416650>>, Proceedings: 16th International symposium on high performance computer architecture, (HPCA, 2010), Jan. 9, 2010, pp. 1-12.

Jo, et al., "FAB: Flash-Aware Buffer Management Policy for Portable Media Players", In IEEE Transactions on Consumer Electronics, vol. 52, Issue 2, Sep. 2006, 9 Pages.

"International Search Report & Written Opinion for PCT Patent Application No. PCT/US2013/034870", Mailed Date: Sep. 5, 2013, Filed Date: Apr. 2, 2013, 11 Pages.

* cited by examiner

*Primary Examiner* — Hiep Nguyen
(74) *Attorney, Agent, or Firm* — Kate Drakos; Micky Minhas

(57) ABSTRACT

A storage management system decouples application write requests from write requests to a flash-based storage device. By placing a layer of software intelligence between application requests to write data and the storage device, the system can make more effective decisions about when and where to write data that reduce wear and increase performance of the storage device. An application has a set of performance characteristics and writes data with a frequency that is appropriate for the application, but not necessarily efficient for the hardware. By analyzing how data is being used by an application, the system can strategically place data in the storage device or even avoid using the storage device altogether for some operations to minimize wear. One technique for doing this is to create an in-memory cache that acts as a buffer between the application requests and the storage hardware.

20 Claims, 4 Drawing Sheets

ENHANCING THE LIFETIME AND PERFORMANCE OF FLASH-BASED STORAGE

BACKGROUND

Data storage hardware has changed in recent years so that flash-based storage is much more common. Rotational media such as hard drives and optical disc drives are increasingly being replaced by flash-based storage, such as solid-state disk (SSD) drives, which have no or fewer moving parts. Solid-state disks are much more robust and are impervious to many types of environmental conditions that are harmful to previous media. For example, rotating media is particularly prone to shocks that can occur, for example, when a mobile computing device containing one is dropped. Flash-based storage also typically has much faster access times and each area of the storage can be accessed with uniform latency. Rotational media exhibits differing speed characteristics based on how close to the central spindle (where the disk rotates faster) data is stored. SSDs, on the other hand, have a fixed amount of time to access a given memory location, and do not have a traditional seek time (which refers to the time to move the reading head to a given location for rotational media).

Unfortunately, SSDs do introduce new limitations as far as how they are read, written, and particularly erased. Typical flash-based storage can only be erased a block at a time, although non-overlapping bits within a block can be set at any time. In a typical computing system, an operating system writes a first set of data to an SSD page, and if a user or the system modifies the data, the operating system either rewrites the entire page or some of the data to a new location, or erases the whole block and rewrites the entire contents of the page. SSD lifetimes are determined by an average number of times that a block can be erased before that area of the drive is no longer able to maintain data integrity (or at least cannot be effectively erased and rewritten). The repeated erasing and rewriting of blocks and pages, respectively, by operating systems only hastens an SSD's expiration.

Several techniques have been introduced to help SSDs last longer. For example, many drives now internally perform wear leveling, in which the firmware of the drive selects a location to store data in a manner that keeps each block erased about the same number of times. This means that the drive will not fail due to one area of the drive being overused while other areas are unused (which could result in the drive appearing to get smaller over time or failing entirely). In addition, the TRIM command was introduced to the Advanced Technology Attachment (ATA) standard to allow an operating system to inform an SSD which blocks of data are no longer in use so that the SSD can decide when to erase. Ironically, disk drives of all types do not know which blocks are in use. This is because operating systems write data and then often only mark a flag to indicate when data is deleted at the file system level. Because the drive does not typically understand the file system, the drive cannot differentiate a block in use by the file system from a block no longer in use because the data has been marked as deleted by the file system. The TRIM command provides this information to the drive, so that the drive can recycle unused blocks.

While these techniques are helpful, they still rely on the drive to mostly manage itself, and do not provide sufficient communication between the drive and the operating system to allow intelligent decision making outside of the drive to prolong drive life. Writes are made today at an application determined frequency and thus do not incorporate any knowledge of how the device is being written to over time and across applications. An application may repeatedly modify and save the same block of data, resulting in multiple erase and rewrite cycles on flash-based devices, which results in more wear of the device.

SUMMARY

A storage management system is described herein that decouples application write requests from write requests to a flash-based storage device. By placing a layer of software intelligence between application requests to write data and the storage device, the system can make more effective decisions about when and where to write data that reduce wear and increase performance of the storage device. Wear leveling is an issue in SSDs and other flash-based storage devices that brings focus to data identification and placement techniques to play an important role in prolonging the flash memory used by SSDs and improving performance. An application has a set of performance characteristics and writes data with a frequency that is appropriate for the application, but not necessarily efficient for the hardware. By analyzing how data is being used by an application, the system can strategically place data in the storage device or even avoid using the storage device altogether for some operations to minimize wear. One technique for doing this is to create an in-memory cache that acts as a buffer between the application requests and the storage hardware. The system may provide what appears to be write access to a flash-based storage device, but may not actually write to the device until the volatility of the data has subsided. By caching the writes in memory, the system can reduce the number of writes to the flash-based device. Thus, the storage management system leverages the operating system's knowledge of how data has been and will be used to place data on flash-based storage devices in a more efficient way.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
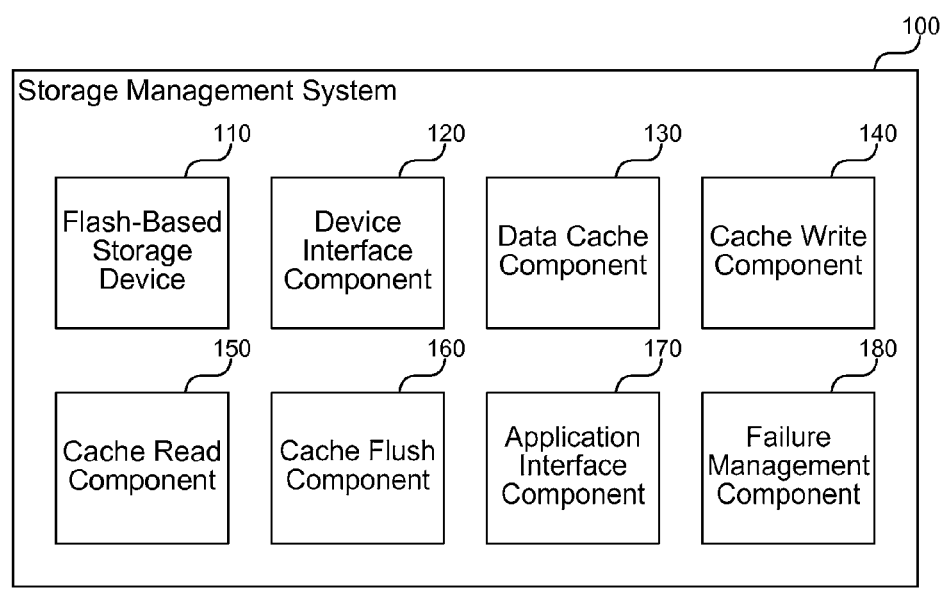
FIG. 1 is a block diagram that illustrates components of the storage management system, in one embodiment.

A storage management system is described herein that decouples application write requests from write requests to a flash-based storage device. By placing a layer of software intelligence between application requests to write data and the storage device, the system can make more effective decisions about when and where to write data that reduce wear and increase performance of the storage device. Wear leveling is an issue in SSDs and other flash-based storage devices that brings focus to data identification and placement techniques to play an important role in prolonging the flash memory used by SSDs and improving performance. An application has a set of performance characteristics and writes data with a frequency that is appropriate for the application, but not necessarily efficient for the hardware. The operating system has a perspective that includes information about both the application's (or multiple applications') requests and the profile of the hardware being used for storage.

Wear leveling in solid-state drives (SSD) is used to recycle memory and prolong the life of the flash-based storage device. Without wear leveling, highly written locations would wear out quickly, while other locations may end up rarely being used. By analyzing how data is being used by an application, the system can strategically place data in the storage device or even avoid using the storage device altogether for some operations to minimize wear. One technique for doing this is to create an in-memory cache that acts as a buffer between the application requests and the storage hardware. The cache can act similar to the copy-on-write (COW) technique in which multiple parties are given access to shared data that they believe is a private copy, but a private copy is not provided until one party modifies the data. Similarly, the system may provide what appears to be write access to a flash-based storage device, but may not actually write to the device until the volatility of the data has subsided. For example, consider an application that reads a file from memory, makes modifications to the file every few seconds over a several minute period, and then closes the file. Using normal flash-based storage paradigms, each write may involve using up a new block or erasing a block repeatedly to write the modifications. By caching the writes in memory, the system can reduce the number of writes to one when the file is closed where that single write incorporates all of the changes made by the application. In this way, the flash-based device has only one block erased rather than multiple erasures over time. Thus, the storage management system leverages the operating system's knowledge of how data has been and will be used to place data on flash-based storage devices in a more efficient way.

As another example, consider an application that makes modifications sequentially to two adjacent or nearby storage locations that are stored in the same block of flash storage. If the operating system adheres to the application's request and writes the first set of modifications to the first location followed by the second set of modifications to the second locations, this may result in the use of two new blocks or two erasures of the existing block to write the modifications. By caching the separate writes made by the application and observing that the writes affect the same block of storage, the system can reduce the number of new blocks used or erasures by flushing the cache and committing both operations in the same action. As another example, many applications write temporary files and between the time the application creates a file, modifies the file several times, and ultimately deletes the file, a substantial amount of wear may occur to the flash-based device that the system can avoid altogether or reduce.

The storage management system provides a strategy for enhancing the life of flash-based memory devices that reduces device wear and enhances the read/write performance of the device. Because the latency to read and write from system or other memory is typically lower than that even of flash-based storage, write operations to and read operations from the in-memory cache are faster than reads/writes to the flash-based device. In some embodiments, the system implements the strategy for managing the writes to the flash device in an operating system device driver so that all users of the flash-based device (e.g., applications, file systems, operating system services, and so forth) can transparently benefit from the improvements. This also allows the system to make cross-application improvements to performance, such as when two applications access the same data.

Upon taking control of the flash-based device, the storage management system's device driver or other embodiment examines the storage device's geometry and capabilities and allocates an in-memory cache for the device. This cache will be used to back writes directed at the flash device and can respond to read requests. Therefore, for instance, if logical block number X were to be modified in the flash device, the system will direct the modified logical block number X to the in-memory cache managed by the driver. In essence, this driver implements a "copy on write" policy for the flash device being managed with the writes being cached in the memory cache. The driver maintains sufficient state to retrieve the correct logical block on the read side. When a read is issued, the driver checks to determine whether the block is currently cached; if it is, the read is satisfied from the cache; if not, the read is satisfied from the flash device. The cached writes are eventually synced with the data on the flash device to ensure that the writes persist, but the quantity and frequency of writes to the flash device may differ from the quantity and frequency of application requests to write to the flash device. The system carefully manages this synchronization to 1) increase availability, performance, and persistence of data, and 2) minimize the wear on the flash device.

The cached writes are synchronized back to the flash device periodically to ensures writes are not lost if the system were to crash. Since the write cache is typically only a fraction in size compared to the capacity of the flash device, the system may also be moved to synchronize upon exhausting free blocks available in the write cache.

FIG. 1 is a block diagram that illustrates components of the storage management system, in one embodiment. The system 100 includes a flash-based storage device 110, a device interface component 120, a data cache component 130, a cache write component 140, a cache read component 150, a cache flush component 160, an application interface component 170, and a failure management component. Each of these components is described in further detail herein.

The flash-based storage device 110 is a storage device that includes at least some flash-based non-volatile memory. Flash-based memory devices can include SSDs, universal serial bus (USB) drives, storage built onto a motherboard, storage built into mobile smartphones, flash storage combined with traditional rotational storage media, and other forms of storage. Flash-based storage devices typically include NAND or NOR flash, but can include other forms of non-volatile random access memory (RAM). Flash-based storage devices are often characterized by fast access times, block-based erasing, and finite quantity of non-overlapping writes that can be performed per page. A flash drive that can no longer be written to is said to have expired or failed.

The device interface component 120 provides an interface between the other components of the system 100 and the flash-based storage device 110. The device interface component 120 may leverage one or more operating system application-programming interfaces (APIs) for accessing storage devices, and may use one or more protocols, such as Serial ATA (SATA), Parallel ATA (PATA), USB, or others. The component 120 may also understand one or more proprietary or specific protocols supported by one or more devices or firmware that allows the system 100 to retrieve additional information describing the available storage locations and layout of the flash-based storage device 110.

The data cache component 130 provides an in-memory cache of data requested to be written to the device by an application. The system 100 may or may not flush the data in the cache to the device 110 or may select particular timing for flushing the data in the cache to the device 110 depending on decisions of the cache flush component 160 described further herein. The data cache component 130 provides an intermediate location in which data requested to be stored by applications can be held without incurring the penalties or downsides of writing the data to flash-based storage while the system 100 waits to determine whether incurring those penalties is actually necessary, and while the system acts to reduce those penalties by reducing the number of writes/erasures of the flash-based storage. In the meantime, data held in the cache is available for faster access at lower latency than data written to the flash-based storage device 110.

The cache write component 140 receives requests to write data to the flash-based storage device 110 and writes the data to the data cache component 130. The cache write component 130 may determine whether a particular block of the flash-based storage device 110 is already stored in the cache and may perform administrative housekeeping to store information in a data structure indicating that new data for a particular block of the device 110 is available in the cache. The cache write component 140 can quickly write data to the cache and then can respond with low latency to the requesting application so that that application can move on to other tasks rather than wait on a typically slower storage request. Thus, the cache write component 140 decouples the application from the particular device capabilities and parameters of the flash-based storage device 110.

The cache read component 150 receives requests to read data from the flash-based storage device 110 and reads the data from either the data cache component 130 or the flash-based storage device 110. Because the cache acts as an intermediate location between the device 110 and application, it is possible that the cache contains newer information than what is stored on the device 110. Because read operations typically rely on receiving the most up to date copy of the data, the cache read component 150 determines whether a newer copy of the data is available in the cache, and if so, serves the read request from the cache. If the particular block is not available in the cache, then the component 150 retrieves the data from the device, and optionally caches the data in the event that the application (or another application) subsequently attempts to re-read or modify (i.e., write) the same location. Requests served from the cache are faster, and thus taking these actions improves performance for applications while reducing wear on the flash-based storage device 110.

The cache flush component 160 copies data stored in the data cache component 130 to the flash-based storage device 110. Flushing is the operation of ultimately reconciling what data has been stored in the cache to non-volatile storage so that the data is available even in the event of a power failure and across computing sessions of potentially long duration. The cache flush component 160 may use a variety of techniques and processes well known in the art to determine when to flush the cache. Caches may be flushed because the cache gets full, because the data has been held in the cache beyond a threshold amount of time (and thus at a higher level of risk of loss), because new data is available that would benefit more from use of the cache, and so forth. The system 100 can apply any of these techniques to manage operation of the cache for the desired performance and wear benefits. In some embodiments, the system 100 provides options that an administrator can configure to alter the tradeoff between increased performance and data safety made by the cache flush component 160.

The application interface component 170 provides an interface between the other components of the system 100 and applications that request to read from or write to the flash-based storage device 110. The application interface component 170 may cooperate with an operating system as a kernel or user-mode device driver. Operating systems generally provide one or more APIs for writing data to storage devices, and the component 170 may intercept such requests destined for the flash-based storage device 110 so that the techniques described herein can be applied to make use of the device 110 more efficient. The system 100 may operate on any number of flash-based storage devices attached to a computing platform at the same time. For example, a platform may include multiple flash-based hard drives, USB devices, and so forth, each of which is used for storing data.

The failure management component 180 optionally handles access and/or movement of data to and from the flash-based storage device 110 as the device is approaching its wear limit or as failures occur. Any time an intermediate storage location is introduced for data, such as the cache herein, the possibility of data loss from power failure or other failures increases. The component 180 may assist the user in moving data to less worn areas of the device 110 or in getting data off the device 110 to avoid data loss. For example, if a file has not been accessed for seven years, the component 180 may suggest that the user allow the system 100 to delete that file from a less worn location to allow other, more significant data to be written to that location. Similarly, the component 180 may assist the user to locate easily replaced files (e.g., operating system files that could be reinstalled from an optical disk) that can be deleted or moved to allow room for more difficult to replace data files that are in over-worn areas of the device 110.

The computing device on which the storage management system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
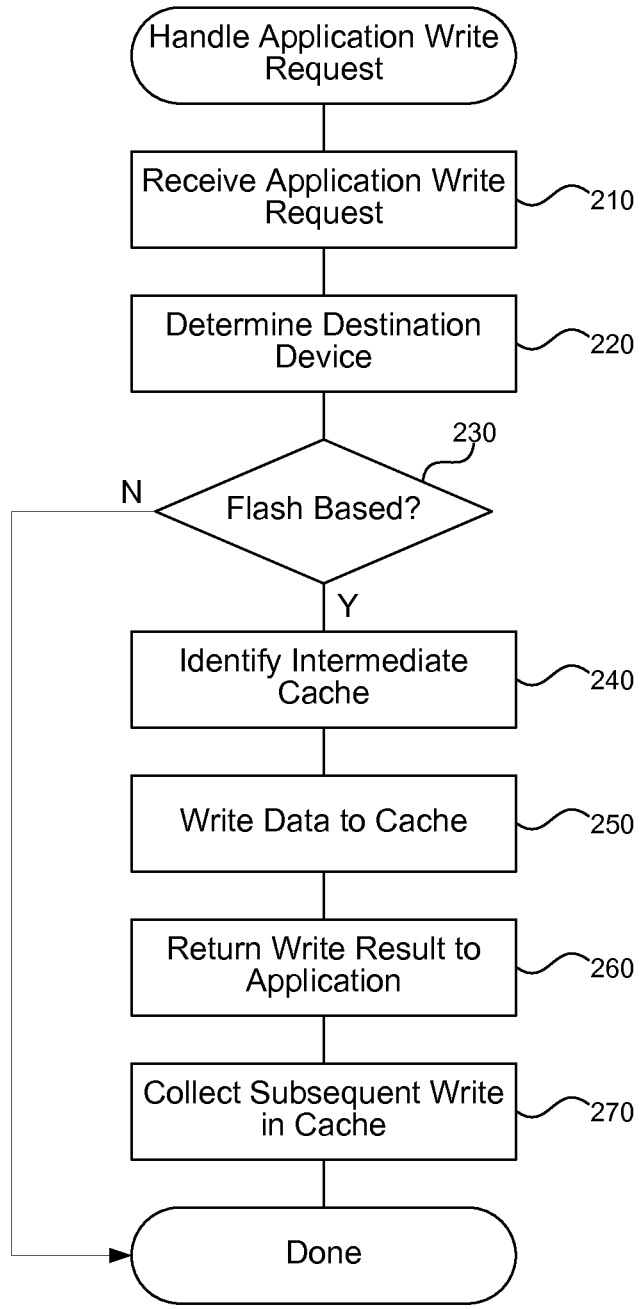
FIG. 2 is a flow diagram that illustrates processing of the storage management system to handle a write request from a software application, in one embodiment.

FIG. 2 is a flow diagram that illustrates processing of the storage management system to handle a write request from a software application, in one embodiment.

Beginning in block 210, the system receives from an application a request to write data to a flash-based storage device. The request may originate from a user request received by a software application, then be received by an operating system in which the storage management system is implemented as a file system driver or other component to manage storage of data on flash-based devices. The received request may include some information about the data, such as a location within a file system where the data will be stored, and may give some information as to the purpose, frequency of access, and the type of access (read/write), needed for the data. For example, if the data is being written to a location within a file system reserved for temporary files, then the system may predict that the data will be written frequently for a short time and then deleted. Similarly, if a file is opened with a "delete on close" flag set, the system may conclude that the file will be used briefly and then deleted.

Continuing in block 220, the system determines a storage device to which the received request is directed. The system determines whether the target storage device is flash-based and will benefit from the in-memory cache and techniques performed by the system. Many computer systems include a combination of flash-based and non-flash-based devices, and some devices combine a flash-based portion in combination with rotational or other media. The device may provide information to the operating system through basic input/output system (BIOS) information or extended firmware interface (EFI), that the system can query to determine physical characteristics of the device.

Continuing in decision block 230, if the system determines that the storage device is flash-based, then the system continues at block 240, else the system completes and handles the write request in a traditional manner. The system may perform other traditional caching techniques even for non-flash-based storage devices. The techniques described herein are compatible with other storage performance-enhancing strategies and may be coupled with such strategies to further improve performance of the storage device, whether or not the device is flash-based.

Continuing in block 240, the system identifies an in-memory cache for collecting data requested by applications to be written to the storage device. If a cache does not yet exist, then the system may allocate an in-memory cache at this stage to handle the present and subsequent data write requests. The cache may be an area of RAM or other memory to which the system can write data without incurring the wear and other penalties of immediately writing the data to the flash-based storage device. The cache described herein operates between the application and the storage device and may act independent of and in addition to other caches, such as a hardware cache within the device itself, a processor cache of the CPU of the computer system, and so forth. The cache may collect multiple write requests and service read requests prior to flushing the data from the cache to the flash-based storage device.

Continuing in block 250, the system writes the data received with the request to the identified in-memory cache without writing the data to the flash-based storage device. The system may also update metadata or other data structures that indicate which data associated with the flash-based storage is currently held in the cache. At some point, the system either flushes the data from the in-memory cache to the flash-based storage device, or determines that writing the data is unnecessary because the data has been deleted or is no longer needed. By combining multiple write requests to a particular block of flash-based memory, the system avoids excessive wear on the flash-based device and improves device performance. At the same time, any requests to read the written data or data in the same block (if the whole block is cached) can be served much faster due to the lower latency of cache memory.

Continuing in block 260, the system returns a write result to the requesting application indicating success or failure of the write operation to the in-memory cache. Typically, the write will be successful and the application will receive a result in less time than writing the data directly to the flash-based storage because of the lower latency of the in-memory cache. This allows the application to move on to other productive work and improves performance even if the cache is not able to later avoid any write operations to the flash-based storage.

Continuing in block 270, the system collects at least one additional write operation in the in-memory cache before writing the data from the first write request and the additional write operation to the flash-based storage device. In this way, the system reduces the number of write requests to the flash-based storage device and decouples the timing and frequency of application write requests from device write requests. This improves application performance and reduces wear on the flash-based storage device. After block 270, these steps conclude.

Figure 3:
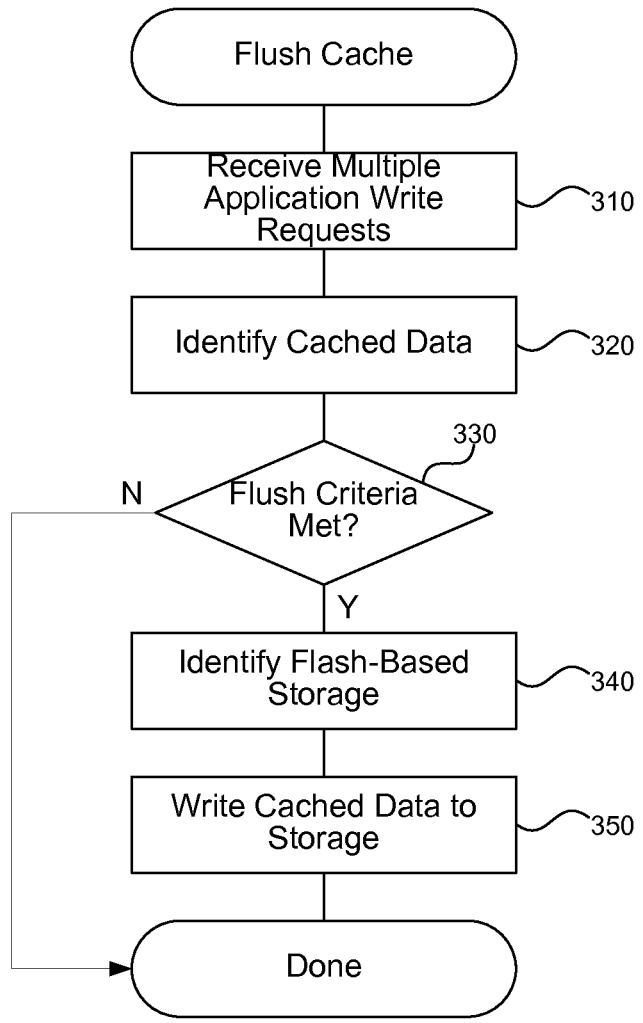
FIG. 3 is a flow diagram that illustrates processing of the storage management system to flush data to a flash-based storage device, in one embodiment.

FIG. 3 is a flow diagram that illustrates processing of the storage management system to flush data to a flash-based storage device, in one embodiment.

Beginning in block 310, the system receives from one or more applications multiple requests to store data on a flash-based storage device and caches the data in an intermediate cache without storing the data on the flash-based storage device at the time of servicing the request. The system may receive the requests over a period of time using a process like that described with respect to FIG. 2, caching the data as each request is received, and then determine an appropriate point at which to flush the data in the cache to the flash-based storage device.

Continuing in block 320, the system identifies the cached data in the intermediate cache and determines whether the cached data will be written to the flash-based storage device. The system may use a variety of criteria for determining at what point to write data stored in the intermediate cache to the flash-based storage device. For example, the system may flush the cache or part of the cache when the cache is full of data, after particular data has resided in the cache for a threshold time, upon receiving more recent data that is more likely to be referenced than older cached data, and so forth.

Continuing in decision block 330, if the system determines that at least one cache flush criterion has been met, then the system continues at block 340, else the system completes and waits for the cache flush criteria to be satisfied. The system may check for the satisfaction of cache criteria upon the occurrence of some event, such as receiving an indication that a write request has arrived to a full cache, or that a timer has expired for checking the state of the cache. The system uses bookkeeping information stored that describes the data in the cache to determine whether the cache criteria have been met. The bookkeeping information may include identification information (e.g., addresses) of blocks of the flash-based storage device that are resident in the cache, how long particular data has been stored in the cache, whether an application is still accessing part of the cache, and so on.

Continuing in block 340, the system identifies the flash-based storage device to which the received requests were directed, wherein the flash-based storage device acts as non-volatile storage for the data in the intermediate cache. In some cases, the system may manage multiple flash-based storage devices and separate caches for each device. In such cases, the system may make flush decisions for each cache at the same time or independently. Each device may be identified by a drive letter, path, or other identifying information assigned to the device by an operating system or other software.

Continuing in block 350, the system writes at least some of the data stored in the intermediate cache to the identified flash-based storage device. The system may or may not clear the cache after storing the data. For example, if the system determines that an application is likely to continue to read or write the data, then keeping it in the cache will allow faster access to the data and further optimization of write quantity and frequency to the flash-based storage device. If, on the other hand, other data is competing for use of the cache, the system may clear the cache and allow other data to use the cache. The writing of data to the flash-based storage device occurs after the original write operation that stored the data to the intermediate cache has already completed. This results in a decoupling of application writes from device writes, and allows the system to reduce the quantity of writes and resulting wear on the device. For frequently written or temporary data, this can result in substantial reduction of device wear and increased performance. After block 350, these steps conclude.

Figure 4:
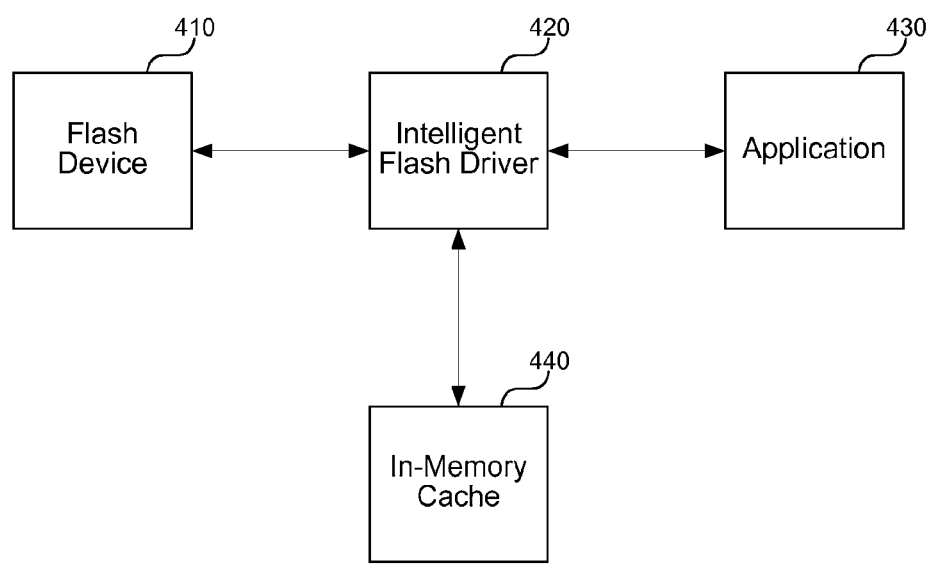
FIG. 4 is a block diagram that illustrates operating components of the storage management system at a high-level, in one embodiment.

FIG. 4 is a block diagram that illustrates operating components of the storage management system at a high-level, in one embodiment. An intelligent flash driver 420 that implements the storage management system sits between a flash device 410 and one or more applications 430. The flash driver 420 intercepts requests from the application 430 to read from or write to the flash device 410. The flash driver 420 redirects write requests to an in-memory cache 440 and serves read requests from either the flash device 410 or the in-memory cache 440 depending on where the requested data is most readily available. Occasionally, the flash driver 420 flushes data stored in the in-memory cache 440 by writing the data to the flash device 410. Typically, the number of requests to write data to the flash device 410 from the intelligent flash driver 420 will be less than a number of requests to write data from the application 430. Thus, the intelligent flash driver 420 reduces burden and wear on the flash device 410.

In some embodiments, the storage management system operates in conjunction with traditional wear leveling techniques for flash-based storage devices. Often writes are managed using a block remap that determines which block to write to of a flash-based storage device in a manner that balances writes to each block. The system can apply the same technique but in conjunction with the in-memory cache described herein will still end up performing fewer writes to the flash-based device so that the overall effect is even lower wear on the flash-based device. Similarly, the system can operate with other caches, wear leveling, or other performance enhancements.

In some embodiments, the storage management system applies journaling or similar techniques to guarantee that data written to the cache can be recovered or reliably rolled back in the event of a failure. The window between writing data to the cache and flushing the data from the cache to the flash-based storage device is typically small, but failures can still occur. Rather than lose data or leave data in an inconsistent state in such an event, the system can use journaling or other techniques to leave the file system in a known state and to recover data if possible.

In some embodiments, the storage management system flushes data from the cache to flash-based storage using a bulk transfer. In other words, even though an application may write several contiguous blocks in separate write requests, the system can transfer all of the data written to the cache to the flash-based storage device using a bulk transfer that copies contiguous blocks in a single request. This can lead to better organization of data on the flash-based storage device and less fragmentation.

From the foregoing, it will be appreciated that specific embodiments of the storage management system have been described herein for purposes of illustration, but that various modifications may be made without deviating from the spirit and scope of the invention. Accordingly, the invention is not limited except as by the appended claims.

I claim:

1. A computer-implemented method to handle a write request from a software application directed to a flash-based storage device, the method comprising:
   receiving from the application a request to write data to the flash-based storage device;
   determining a storage device to which the received request is directed;
   upon determining that the storage device is flash-based, identifying an in-memory cache for collecting data requested by applications to be written to the storage device;
   writing the data received with the request to the identified in-memory cache without writing the data to the flash-based storage device;
   returning a write result to the requesting application indicating success or failure of the write operation to the in-memory cache; and
   collecting at least one additional write operation in the in-memory cache before sending the data from the first write request and the additional write operation to the flash-based storage device,
   wherein the preceding steps are performed by at least one processor.

2. The method of claim 1 wherein receiving the request comprises receiving the request in response to a user action in a software application, wherein the software application invokes an operating system application programming interface (API) for storing data on the flash-based storage device.

3. The method of claim 1 wherein receiving the request comprises receiving information related to the data including an indication of an expected frequency of access of the data.

4. The method of claim 1 wherein determining the storage device comprises determining whether the target storage device is flash-based and will benefit from in-memory caching of write requests.

5. The method of claim 1 wherein determining the storage device comprises reading information provides by a basic input/output system (BIOS) or extended firmware interface (EFI) to determine physical characteristics of the device.

6. The method of claim 1 wherein identifying an in-memory cache comprises determining that the cache does not yet exist and allocating an in-memory cache to handle the present and subsequent data write requests.

7. The method of claim 1 wherein identifying an in-memory cache comprises identifying an area of random access memory (RAM) to which the system can write data without incurring the wear and other penalties of immediately writing the data to the flash-based storage device.

8. The method of claim 1 wherein the cache collects multiple write requests and services any received read requests prior to flushing the data from the cache to the flash-based storage device.

9. The method of claim 1 wherein writing the data to the cache comprises updating metadata that indicates which data associated with the flash-based storage is currently held in the cache.

10. The method of claim 1 further comprising flushing the data from the in-memory cache to the flash-based storage device, or determining that writing the data is unnecessary because the data has been deleted.

11. The method of claim 1 wherein writing data to the cache and later flushing the data combines multiple write requests to a particular block of flash-based memory, thereby avoiding excessive wear on the flash-based device and improving device performance.

12. The method of claim 1 wherein returning a write result comprises providing the result to the application in less time than writing the data directly to the flash-based storage because of the lower latency of the in-memory cache.

13. A computer system for enhancing the lifetime and performance of flash-based storage, the system comprising:
    a flash-based storage device that includes at least some flash-based non-volatile memory;
    a device interface component that provides an interface between the other components of the system and the flash-based storage device;
    a data cache component that provides an in-memory cache of data requested to be written to the flash-based storage device by an application;
    a cache write component that receives requests to write data to the flash-based storage device and writes the data to the data cache component instead;
    a cache read component that receives requests to read data from the flash-based storage device and determines whether the requested data is available from the data cache component without accessing the flash-based storage device;
    a cache flush component that copies data stored in the data cache component to the flash-based storage device at a time decoupled from application requests to write data;
    an application interface component that provides an interface between the other components of the system and one or more applications that request to read from or write to the flash-based storage device.

14. The system of claim 13 wherein the flash-based storage device performs block-based erasing, and has a finite quantity of non-overlapping writes that can be performed per block before the data can no longer be reliably written to a block.

15. The system of claim 13 wherein the device interface component receives requests directed to one or more operating system application-programming interfaces (APIs) for accessing storage devices.

16. The system of claim 13 wherein the data cache component provides an intermediate location in which data requested to be stored by applications can be held without incurring the penalties of writing the data to flash-based storage, and while the system acts to reduce those penalties by reducing the number of writes/erasures of the flash-based storage.

17. The system of claim 13 wherein the cache write component determines whether a particular block of the flash-based storage device is already stored in the cache and stores information in a data structure indicating that new data for a particular block of the device is available in the cache.

18. The system of claim 13 wherein the cache flush component flushes data upon determining that the cache is full and contains no non-dirty locations for writing new data.

19. The system of claim 13 wherein the application interface component cooperates with an operating system as a kernel or user-mode device driver to intercept requests from applications and redirect requests to the flash-based storage device to the data cache component.

20. A computer-readable storage medium device comprising instructions for controlling a computer system to flush cached data to a flash-based storage device, wherein the instructions, upon execution, cause a processor to perform actions comprising:
    receiving from one or more applications multiple requests to store data on a flash-based storage device and caching the data in an intermediate cache without storing the data on the flash-based storage device at the time of servicing the request;
    identifying the cached data in the intermediate cache and determining whether the cached data will be written to the flash-based storage device;
    upon determining that one or more criteria for flushing the cache have been met,
    identifying the flash-based storage device to which the received requests were directed, wherein the flash-based storage device acts as non-volatile storage for the data in the intermediate cache; and
    writing at least some of the data stored in the intermediate cache to the identified flash-based storage device such that the writing of data to the flash-based storage device occurs after the original write operation that stored the data to the intermediate cache has already completed, resulting in a decoupling of application writes from device writes that reduces a quantity of writes and resulting wear on the device.

* * * * *